US008330973B2

(12) United States Patent
Tagawa

(10) Patent No.: US 8,330,973 B2
(45) Date of Patent: Dec. 11, 2012

(54) INFORMATION PROCESSOR AND COMPUTER READABLE MEDIUM FOR EXECUTING AN EXTERNAL APPLICATION UNDER CONTROL OF AN OPERATING SYSTEM

(75) Inventor: Masatoshi Tagawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 817 days.

(21) Appl. No.: 12/468,653

(22) Filed: May 19, 2009

(65) Prior Publication Data
US 2010/0118324 A1 May 13, 2010

(30) Foreign Application Priority Data

Nov. 13, 2008 (JP) .................................. 2008-290996

(51) Int. Cl.
*G06F 3/12* (2006.01)
(52) U.S. Cl. ............... 358/1.13; 358/1.14; 358/1.15; 711/147; 711/148; 711/152; 711/153; 719/315; 719/329; 709/223; 709/238; 709/215
(58) Field of Classification Search .............. 358/1.13, 358/1.14, 1.15; 711/147, 148, 152, 153; 719/315, 329; 709/223, 238, 215
See application file for complete search history.

(56) References Cited

U.S. PATENT DOCUMENTS

| 6,061,740 | A | * | 5/2000 | Ferguson et al. ............ 709/246 |
| 8,095,940 | B2 | * | 1/2012 | Bissett et al. ................. 719/320 |
| 2002/0054326 | A1 | | 5/2002 | Morita |
| 2003/0218765 | A1 | | 11/2003 | Ohishi |
| 2004/0226023 | A1 | | 11/2004 | Tucker |
| 2007/0233837 | A1 | * | 10/2007 | Imai .............................. 709/223 |
| 2009/0106780 | A1 | * | 4/2009 | Nord et al. .................... 719/329 |

FOREIGN PATENT DOCUMENTS

| JP | 2002-082806 A | 3/2002 |
| JP | 2003-101768 A | 4/2003 |
| JP | 2004-030601 A | 1/2004 |
| JP | 2004-334893 A | 11/2004 |
| JP | 2007-265193 A | 10/2007 |
| JP | 2008-165377 A | 7/2008 |
| JP | 2010-020713 A | 1/2010 |

OTHER PUBLICATIONS

Japanese Office Action, dated Oct. 19, 2010, issued in Application No. 2008-290996.

* cited by examiner

*Primary Examiner* — Jacky X Zheng
(74) *Attorney, Agent, or Firm* — Sughrue Mion, PLLC

(57) ABSTRACT

An information processor for executing multiple applications including an external application under a control of an operating system, includes: a executing section that executes the external application in an isolated environment based on user identification information that is under the control of the operating system and allocated to the external application.

8 Claims, 18 Drawing Sheets

FIG.13

```
Example of Jail application setting file (No. 1)
<?xml version="1.0" encoding="UTF-8"?>
<jailAppDescription xmlns="http://www.AAAcompany.co.jp/2007-
09/spider/external/appsInfo/1.0/"
xmlns:xsi="http://www.w3.org/2001/XMLSchema-instance"
xsi:schemaLocation="http://www.AAAcompany.co.jp/2007-09/spider/external/appsInfo/1.0/
JailAppsInfo.xsd">
<vendorInfo>
                            <!-- vendor ID -->
                            <vendorId>0123</vendorId>
                            <!-- product ID -->
                            <productId>0123</productId>
                            <vendorName>
                                                                    <title>
<resourceString>AAA Co.Ltd</resourceString>
                                                                    </title>
                            </vendorName>
                            <vendorName x-lang="ja_JP">
                                                                    <title>
<resourceString>AAA corporation</resourceString>
                                                                    </title>
                            </vendorName>
                            <vendorAddress>
                                                                    <title>
<resourceString>toiawase@AAAcompany.co.jp</resourceString>
                                                                    </title>
                            </vendorAddress>
                            <vendorComment>
                                                                    <title>
<resourceString>http://www.AAAcompany.co.jp</resourceString>
                                                                    </title>
                            </vendorComment>
</vendorInfo>
<jailAppInfo>
                            <!--
              Identification name of executable
     The name designated in this element must have been registered by the user as a
local account name in an execution environment.
     Although it is assumed that a command name is used customarily as the
identification name, in the case that the command name ends up with vm or interpreter, it
is assumed that the name of the program to be executed thereby is used as the
identification name.
                            -->
```

FIG. 13 (Continued)

```
            <applicationName>browser</applicationName>
            <applicationType>normal</applicationType>
            <!--
            Required display capability
  The X-direction resolution and the Y-direction resolution are designated
        by the number of pixels, and the color resolution is designated
by the minimum number of colors supported (256 colors in 8-bit representation).
      Unsupported in the case of -1, and unlimited in the case of omission.
            -->
            <requiredXResolution>640</requiredXResolution>
            <requiredYResolution>480</requiredYResolution>
            <requiredMonoResolution>-1</requiredMonoResolution>
            <requiredColorResolution>8</requiredColorResolution>
            <!--
            Limitation in the number of starting times.
            Use a number in the range of 1 to 999.
            If designation is omitted,
  it is assumed that the number of starting times is unlimited.
            -->
            <limitPerSession>7</limitPerSession>
            <lastProcessName>browser.bin</lastProcessName>
</jail AppInfo>
         <
```

FIG.14

```
Example of Jail application setting file (No. 2)
<execConfig>
                                    <!--
                        Additional environment information
                                    -->
            <addEnv key="PATH">/usr/share/browser/bin</addEnv>
            <addEnv key="LD_LIBRARY_PATH">/usr/share/browser/lib</addEnv>

<exec timeout="6000">gooxxx.sh</exec>
                                    <!--
        In the case that, when a Jail application is requested to be started,
the Jail application cannot be started because the number of starting times has exceeded
     the limit number of starting times designated using limitPerSystem, limitPerUser or
         limitPerDisplay, designate one of the following as a process to be performed.
                        active:  Started process is activated.
            restart: Started process is ended and then restarted.
                        nop:    Start request is ignored.
                                    -->

<overLimitHandler>active</overLimitHandler>

<terminator timeout="6000/">
</execConfig>
<execParams>
                                    <parameter>
                                            <paramdata>-P</paramdata>
                                    </parameter>
                                    <parameter>
                        <paramdata>http://www.AAAcompany.co.jp/</paramdata>
                                    </parameter>
</execParams>

<menuResource>
                                    <icon>
                                            <resourceId>browser.png</resourceId>
                                    <title>
                                            <resourceId>Browser</resourceId>
                                    </title>
                                    <description>
                                            <resourceString>Browser title</resourceString>
                                    </description>
</menuResource>
```

FIG.14 (Continued)

```
<menuResource x-lang="ja_JP">
                    <icon>
                        <resourceId>browser.png</resourceId>
                    </icon>
                    <title>
                        <resourceId>Browser</resourceId>
                    </title>
                    <description>
                        <resourceString>Browser</resourceString>
                    </description>
</menuResource>
```

*FIG.15*

| APPLICATION NAME | UID | DIRECTORY | |
|---|---|---|---|
| BROWSER | 100 | /browser | |
| DOCUMENT MANAGEMENT | 101 | /bunsho | |
| | | | |

# INFORMATION PROCESSOR AND COMPUTER READABLE MEDIUM FOR EXECUTING AN EXTERNAL APPLICATION UNDER CONTROL OF AN OPERATING SYSTEM

CROSS-REFERENCE TO RELATED APPLICATIONS

This application is based on and claims priority under 35 USC 119 from Japanese Patent Application No. 2008-290996 filed Nov. 13, 2008.

BACKGROUND

1. Technical Field

The present invention relates to an information processor and a computer readable medium.

2. Related Art

In office automation products including copiers and multifunctional printers, household electric appliances, and other products, platforms specific to such products have been constructed by employing a universal operating system. In such environments, it is possible to increase the added values of such products by introducing external applications, such as applications created by third-party vendors and open-source software. Furthermore, in such products having specific uses, user interfaces specific to such products have been prepared. And external applications are frequently adapted to such user interfaces. In many cases, system information of the product including user interfaces is propriety information and not disclosed externally. For this reason, product developers deal with such adaptation.

Moreover, certain specification requirements, such as ensuring security, are supposed to be satisfied in developing special-purpose products.

SUMMARY

According to an aspect of the invention, an information processor for executing multiple applications including an external application under a control of an operating system, includes: a executing section that executes the external application in an isolated environment based on user identification information that is under the control of the operating system and allocated to the external application.

BRIEF DESCRIPTION OF THE DRAWINGS

Exemplary embodiment(s) of the present invention will be described in detail based on the following figures, wherein:

FIG. 13 is a view illustrating an example of external application setting information;

FIG. 14 is a view illustrating another example of external application setting information; and FIG. 15 is a table illustrating examples of the user IDs and the root directories of the isolated environments of external applications.

DETAILED DESCRIPTION

An exemplary embodiment according to the present invention will be described below.

This exemplary embodiment will be described by taking a multifunctional printer equipped with a copying function, a facsimile communication function, a printing function, an image reading function, etc. as an example. However, the present invention is applicable to other office automation products and household electric appliances under a condition that such products are each configured to have a computer system for performing the functions specific to the products. The function blocks described below are constructed by causing the hardware resource of the computer to collaborate with various software resources.

Figure 1:
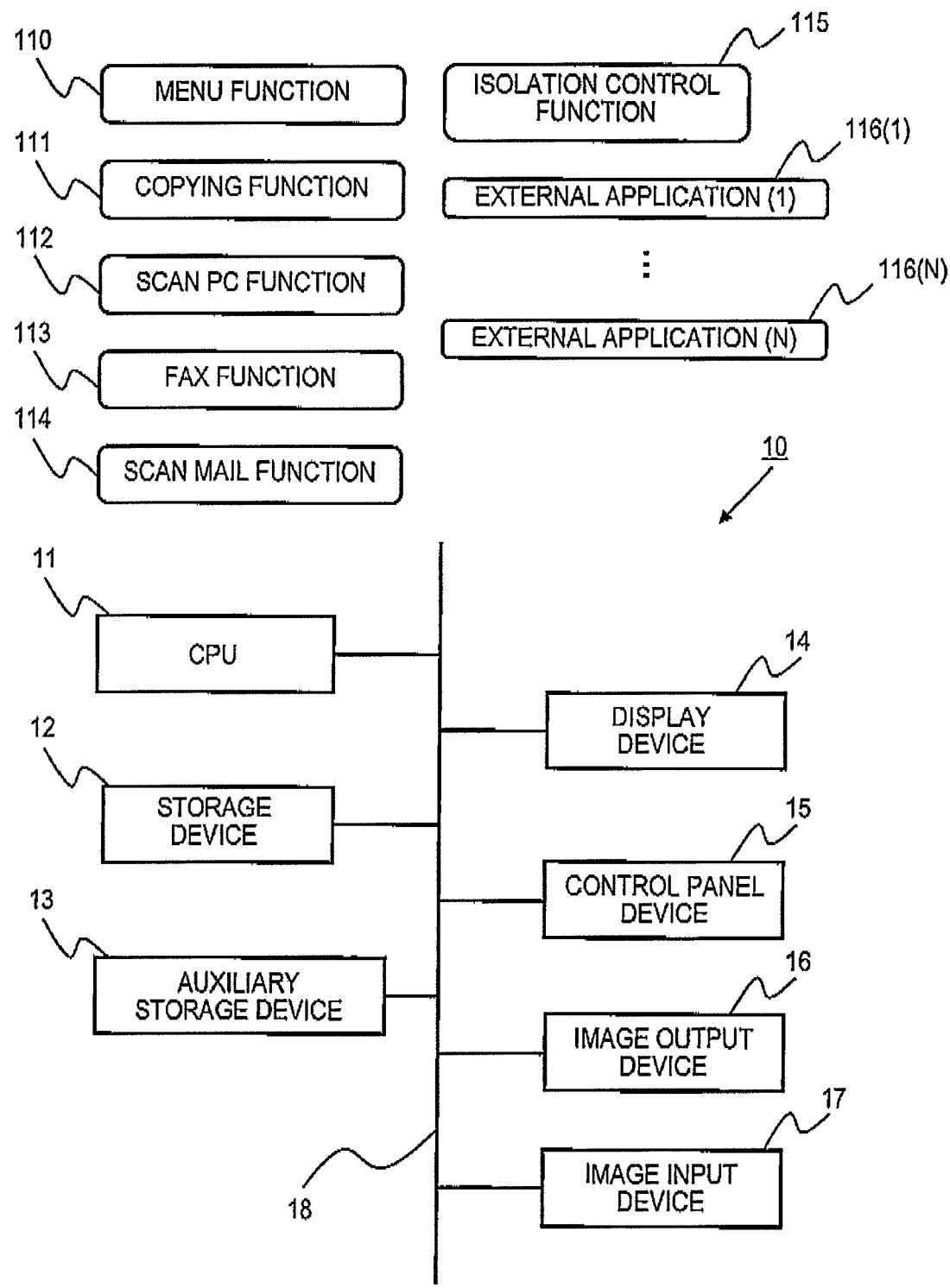
FIG. 1 is a view showing the entire configuration of an exemplary embodiment according to the present invention.

FIG. 1 shows the entire configuration of a multifunctional printer 10 according to the exemplary embodiment of the present invention. Referring to this figure, the multifunctional printer 10 includes a CPU 11, a storage device (main memory) 12, an auxiliary storage device 13, a display device 14, a control panel device 15, an image output device 16, an image input device 17, a bus system 18, etc. The multifunctional printer 10 may also include sub-systems specific to the product in addition to a base computer system. The computer system may be connected to the sub-systems via dedicated buses. Although the computer system is typically a personal computer or a computer conforming thereto and modified so as to be adapted for the manufacturing industry, the computer system is not limited to such a computer. The auxiliary storage device 13 is a direct access storage device, such as a hard disk drive, for storing an operating system (also referred to as an OS), application programs for achieving various functions, various data, etc. Although the OS is typically a UNIX (registered trade name) based operating system, and LINUX (registered trade name) and FreeBSD (registered trade name), for example, can be adopted, the OS is not limited to these. The CPU 11 reads various programs in the storage device 12 and executes various functions. In this example, the functions achieved by the CPU 11 include a menu function (also referred to as a menu application) 110, a copying function 111, a scan PC function 112, a FAX function 113, a scan mail function 114, an isolation control function 115 and an external application function 116.

Figure 2:
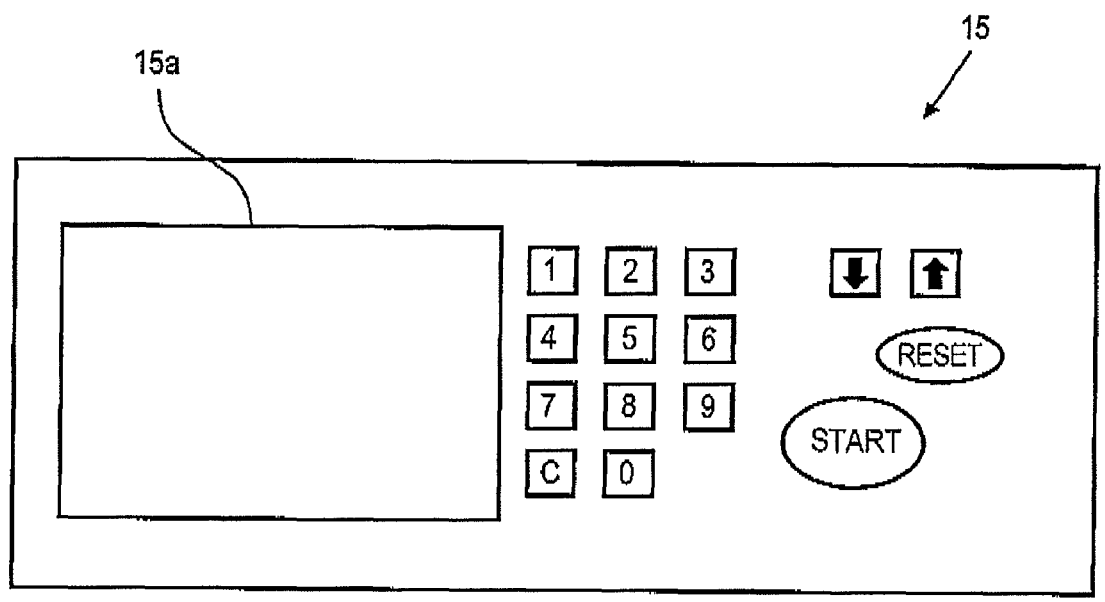
FIG. 2 is a view illustrating an example of the control panel shown in FIG. 1.

The control panel device 15 has such a configuration as shown in FIG. 2, and the control panel device 15 and the display device 14 serve as user interface for supplying various directions to the multifunctional printer 10. In this example, the display device 14 is achieved by using a liquid crystal display device 15a installed in the control panel device 15.

The image output device 16 typically forms images on paper media and the like by using an electrophotographic technology. The image input device 17 forms image data by optically scanning an image of a manuscript placed on a platen or the like. The bus system 18 contains the system bus for the base computer system and expansion buses for achieving connection to the sub-systems.

The copying function 111, the scan PC function 112, the FAX function 113, the scan mail function 114 described above are functions prepared for commonly used multifunctional printers. The copying function 111 is used to appropriately perform image processing on the basis of the image data read by the image input device 17 and then to output printed images from the image output device 16. The scan PC function 112 is used to store the manuscript image data read by the image input device 17 in the storage section (auxiliary storage device) of the computer (PC) so that the data can be managed. The FAX function 113 is used to facsimile-transmit the manuscript image data read by the image input device 17 using a communication function (not shown). The scan mail function 114 is used to mail the manuscript image data read by the image input device 17 to previously registered mail addresses using a mail function (not shown). The multifunctional printer 10 may be equipped with a mail server function (not shown), such as the SMTP server function.

The menu function 110 provides a user interface includes selecting functions (jobs) of the multifunctional printer 10.

The isolation control function 115 executes and controls external applications 116 (116(1) to 116(N)) in respective isolated environments (also referred to as JAIL environments). The isolated environment indicates an environment in which a program running inside the isolated environment cannot freely gain access to resources outside the isolated environment. The isolated environment can be achieved using a chroot command for changing the root directory, a JAIL command, a JAIL tool and a virtual OS function.

Figure 6:
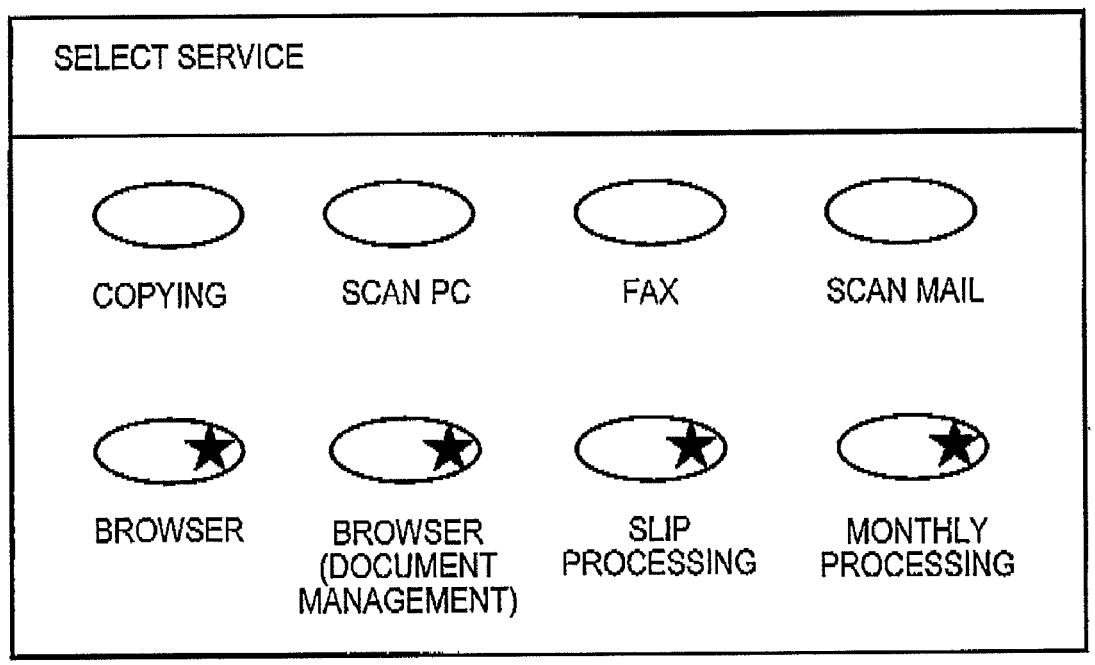
FIG. 6 is a view illustrating an example of a service selection user interface according to the above-mentioned exemplary embodiment.

The external applications 116 are optional applications added before shipment, at the time of shipment or at an installation site. In this example, each of the external applications is an application in which a user ID under the control of the OS (refer to numeral 30 in FIG. 3) is allocated and which is executed in an isolated environment on the basis of the user ID. In this example, a browser function (HTML), a document management function, a slip processing function and a monthly processing function are included as shown in FIG. 6, but the functions are not limited to these. The browser function is a browser conforming to HTML. The document management function is used to browse documents stored in a document management system (an external server) using a predetermined agent program. The "slip processing" function is a function for processing slips in the account processing for a specific user. The monthly processing function is a function for performing processing of every specific month for a specific user. Although these external applications 116 have been obtained typically from OSS (open source software) and external developers, the external applications are not limited to these. For example, the external applications may be developed independently by the developers of multifunctional printers.

Figure 3:
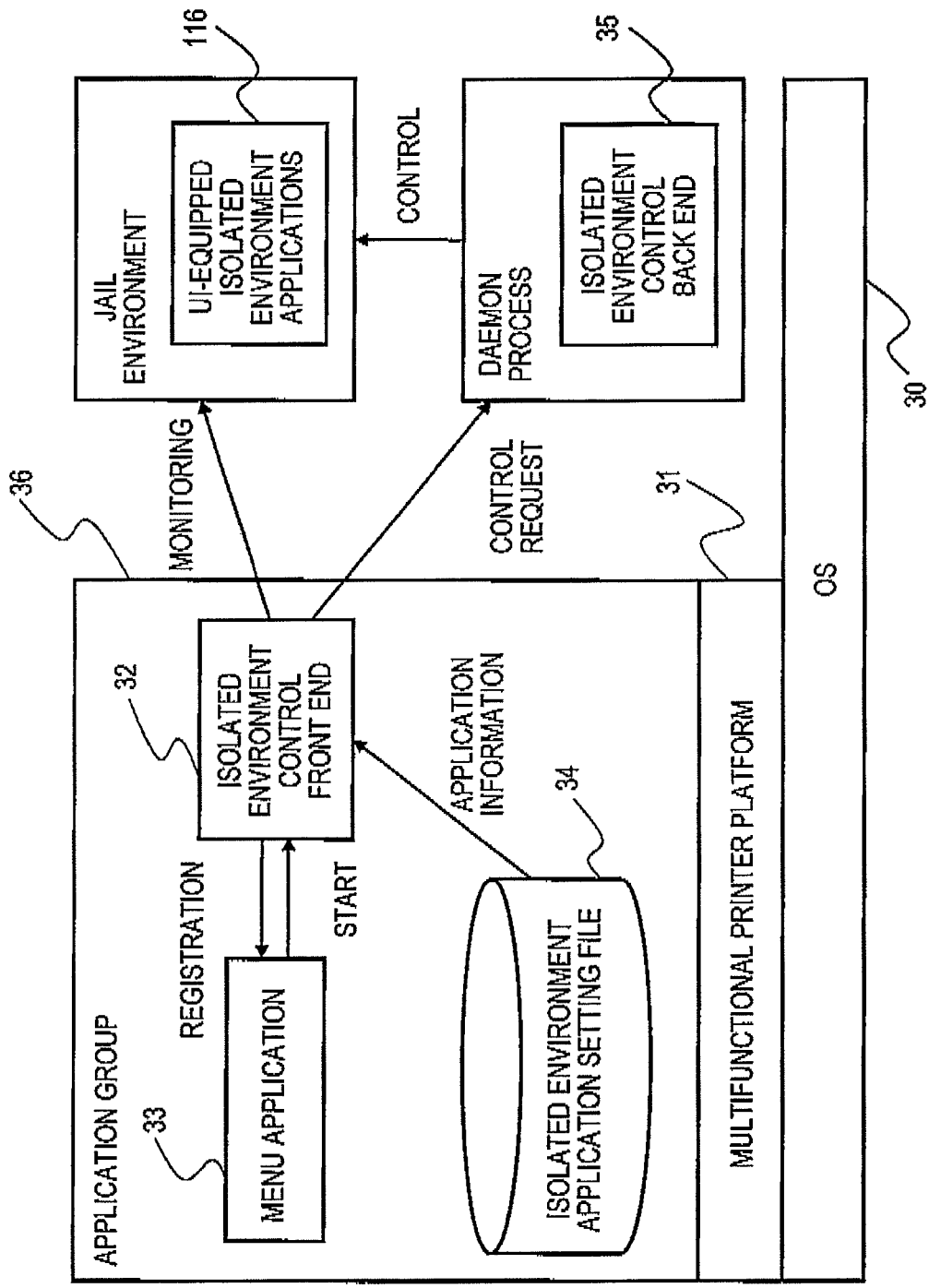
FIG. 3 is a view hierarchically illustrating the system of the exemplary embodiment shown in FIG. 1.

FIG. 3 shows the hierarchical structure of the system of the multifunctional printer 10. In this figure, a multifunctional printer platform 31 is provided on the hierarchical layer of the OS 30. An application group 36 for the multifunctional printer 10 is placed on the multifunctional printer platform 31. The application group 36 includes a menu function 33, an isolated environment control front end 32, etc. in addition to applications for achieving various functions of an ordinary multifunctional printer. The isolated environment control front end 32 registers button indication for selecting the services of the external applications (also referred to as user interface-equipped isolated environment applications or UI-equipped isolated environment applications) 116 in the menu application 33 and performs control to start the external application 116 requested to be executed via the user interface (the control panel device 15) of the menu application 33 in an isolated environment. When performing control to start the external application 116 in the isolated environment, the isolated environment control front end 32 refers to an isolated environment application setting file 34. The user interface-equipped isolated environment application 116 is executed in the isolated environment and can be menu-driven using the application interface of the menu application 33.

The external applications 116 and an isolated environment control back end 35 are managed on the OS 30. The isolated environment control back end 35 is started as a daemon process (a process operating continuously in the background after the start). After receiving a control request from the isolated environment control front end 32, the isolated environment control back end 35 starts each external application 116 in an isolated environment.

Figure 4:
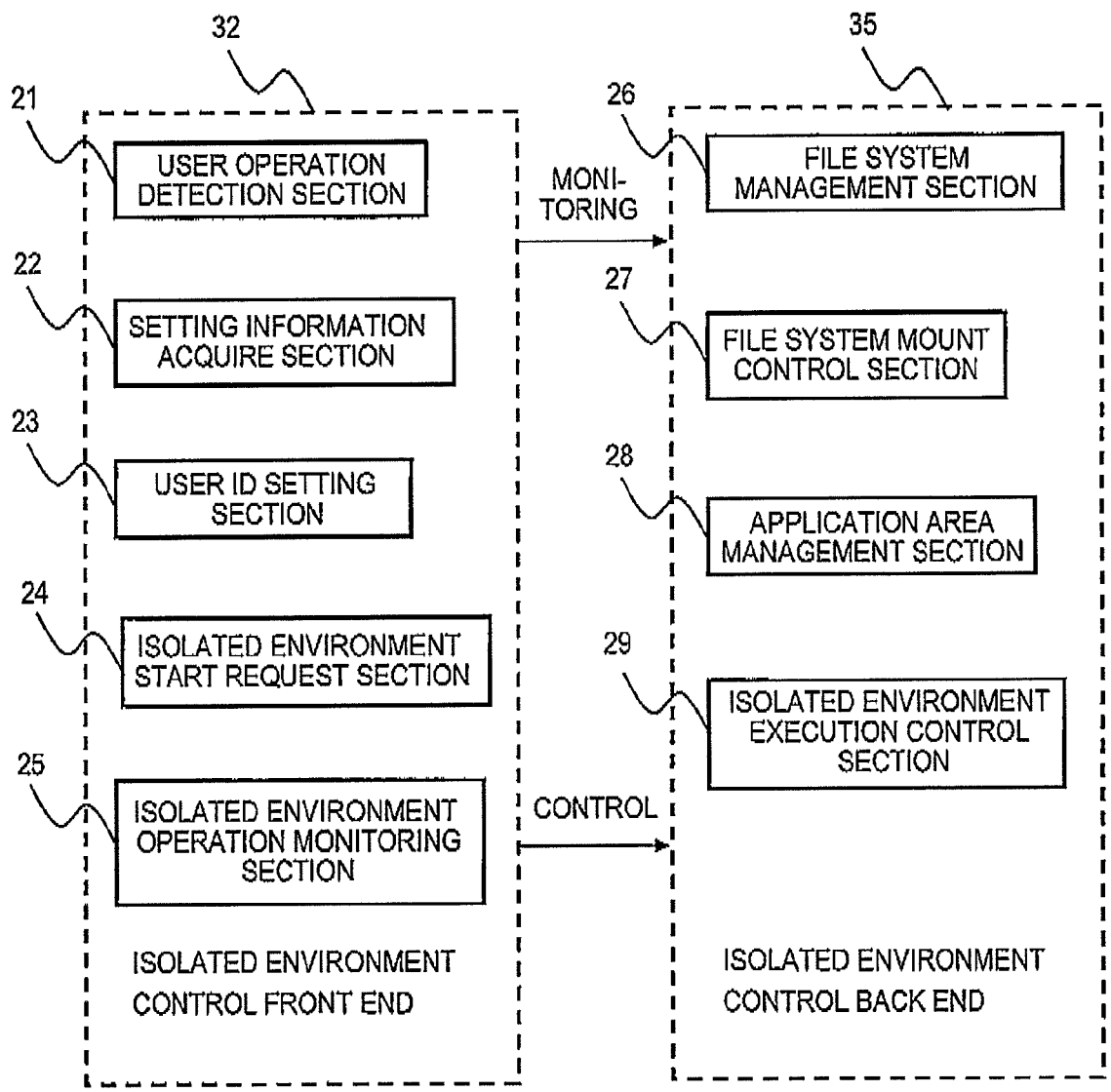
FIG. 4 is a view illustrating examples of the configurations of the isolated environment control front end and the isolated environment control back end shown in FIG. 3.

FIG. 4 is a function block diagram showing examples of the detailed configurations of the isolated environment control front end 32 and the isolated environment control back end 35. In this figure, the isolated environment control front end 32 includes a multifunctional printer user operation detection section 21, a setting information acquiring section 22, a user ID setting section 23, an isolated environment start request section 24, an isolated environment operation monitoring section 25, etc. The isolated environment control back end 35 contains a file system management section 26, a file system mount control section 27, an application area management section 28 and an isolated environment execution control section 29.

The multifunctional printer user operation detection section 21 detects that a multifunctional printer user (also referred to as an application user) has logged into the multifunctional printer 10 and has first used one of the external applications 116. The setting information acquiring section 22 acquires the setting information of the external applications. The user ID setting section 23 sets a user ID for each of the external applications 116 under the control of the OS 30. The setting of the user ID can be achieved using a setuid command, for example. The user ID of each of the external applications 116 has been registered previously as shown in FIG. 15, and this user ID is referred to. In addition, the root directories are also registered associated with the isolated environments as shown in FIG. 15. In the example shown in FIG. 15, the user ID of "browser" is "100" and the root directory of the isolated environment thereof is "/browser". Furthermore, the user ID of "document management" is "101" and the root directory of the isolated environment thereof is "/bunsho". In an example of a directory structure shown in FIG. 8, the root directories "/browser", "/bunsho", . . . of the isolated environments are located as sub-directories of "/opt/jail.

The isolated environment start request section 24 delivers an instruction to start each external application 116 in the isolated environment thereof. The isolated environment operation monitoring section 25 monitors the operation of each external application 116 being executed in the isolated environment thereof.

The file system management section 26 creates a file for each multifunctional printer user and for managing this file as a file system. The file system mount control section 27 mounts a file system created for a multifunctional printer user in a designated area. The application area management section 28 detects whether an area is available for an application inside the mounted file system, and creates an area for the application when no area is available. And the application area management section sets the directory (referred to as "home" directory, for convenience) of a multifunctional printer user into the area for the application. The isolated environment execution control section 29 sets an operation environment so as to correspond to an application and causes the designated external application to execute in the isolated environment thereof. The file system mount control section 27 mounts the file system of the multifunctional printer user upon login of the multifunctional printer user and unmounts the file system upon logout. The "home" directory serving as the directory of each multifunctional printer user is different from a "home" directory (not shown) that is created as a sub-directory of the root directory (/) in an ordinary directory structure, although the names are the same. In some cases, these are referred to differently; the former is referred to as the "home" directory of a multifunctional printer user (application user) and the latter is referred to as the "home" directory of a user (OS user) under the control of the OS. The "home" directory of such a user under the control of the OS is the highest directory in the disk area freely available to each of the users under the control of the OS. However, the "home" directory of each multifunctional printer user is the highest directory in the disk area for storing data for each multifunctional printer user (who is not a user under the control of the OS but a person who submits a job to an application to be executed using the authority of a user under the control of the OS), and it should thus be noted that the "home" directory is different from the "home" directory that is used in the representation of a commonly used disk structure. Furthermore, "mount" indicates a procedure that is performed so that a file system can be used from the operating system. In a broad sense, "mount" indicates a procedure that is performed so that a file system constructed on a given disk storage can be recognized and cannot be unmounted without an appropriate procedure.

The operation of this exemplary embodiment will be described next.

Figure 5:
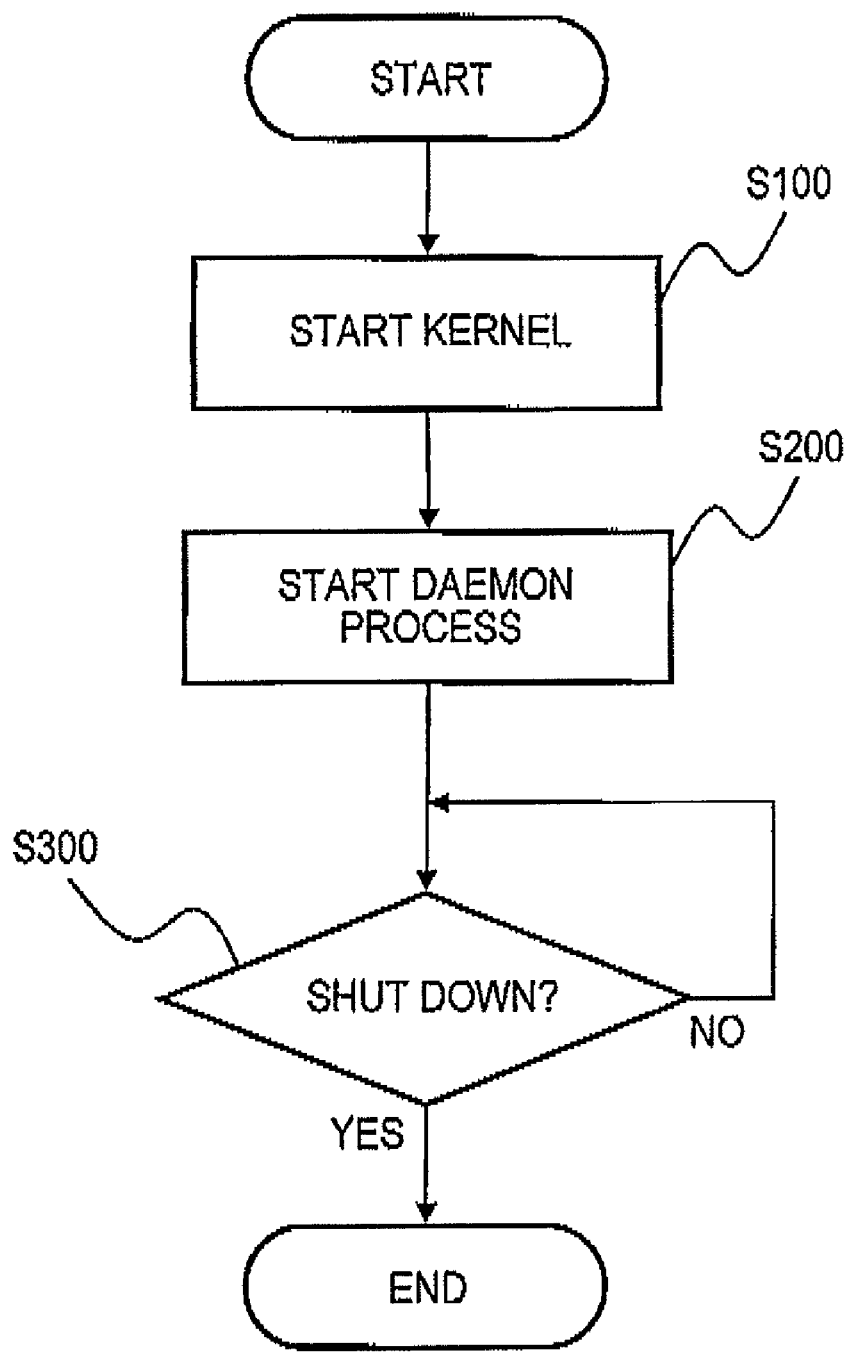
FIG. 5 is a view illustrating an example of the overall operation of the above-mentioned exemplary embodiment.

FIG. 5 shows an outline of the operation of the exemplary embodiment Referring to this figure, when electric power supply is started to the multifunctional printer 10, a bootstrap procedure is started, whereby the kernel is started (at step S100). After this, a daemon process is started (at step S200). In this example, the daemon process is at least a part of the menu application 33, the isolated environment control front end 32 and the isolated environment control back end 35. The menu application 33 is used to display such a service selection user interface as shown in FIG. 6 on the liquid crystal display device 15*a* (the display device 14) of the control panel device 15. Each multifunctional printer user selects a service using this user interface.

After this, the operation of the multifunctional printer 10 is completed when the system is shut down (at step S300).

When the menu application 33 or a part thereof serving as the daemon process is started at step S200, such an operation selection display as shown in FIG. 6 is shown on the liquid crystal display device 15*a* of the control panel device 15. Each service can be selected by designating and operating a selection button on the operation selection display. Since the selection buttons representing the functions based on the external applications 116 are indicated with star marks in FIG. 6, the user can easily recognize that the selection buttons correspond to the external applications. If an error occurs during the operation of one of the external applications 116 and the contact information of the provider or the like of the corresponding external application 116 is shown on the display, the user can easily take measures against trouble encountered during the use of the external application.

Figure 9:
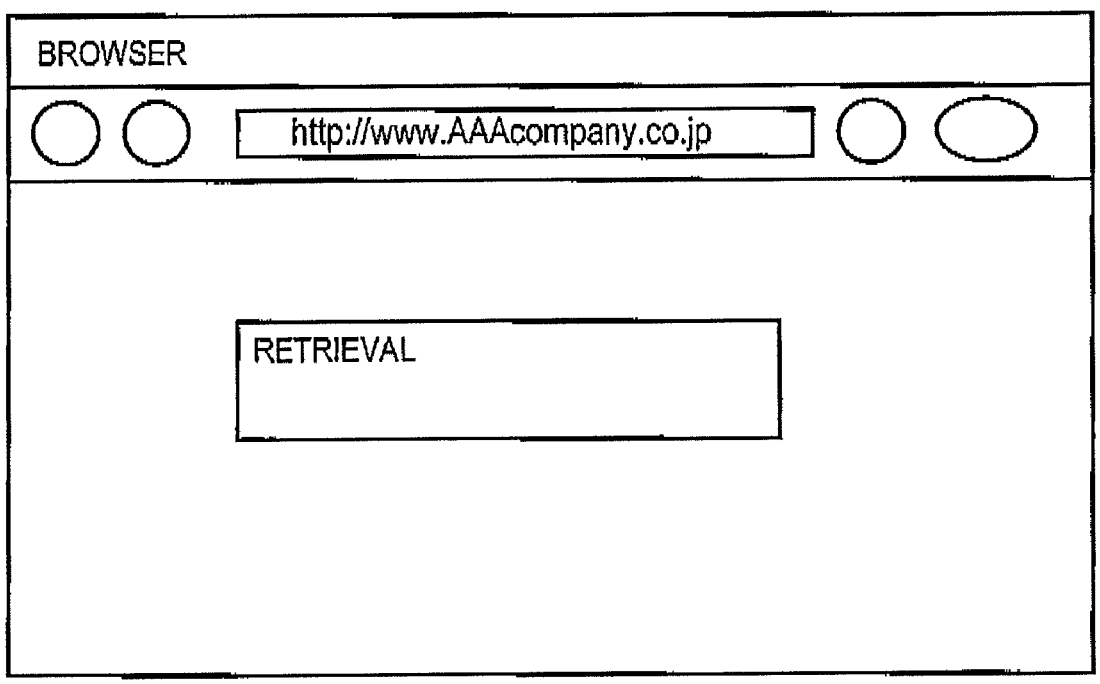
FIG. 9 is a view illustrating a display example of an external application.
Figure 10:
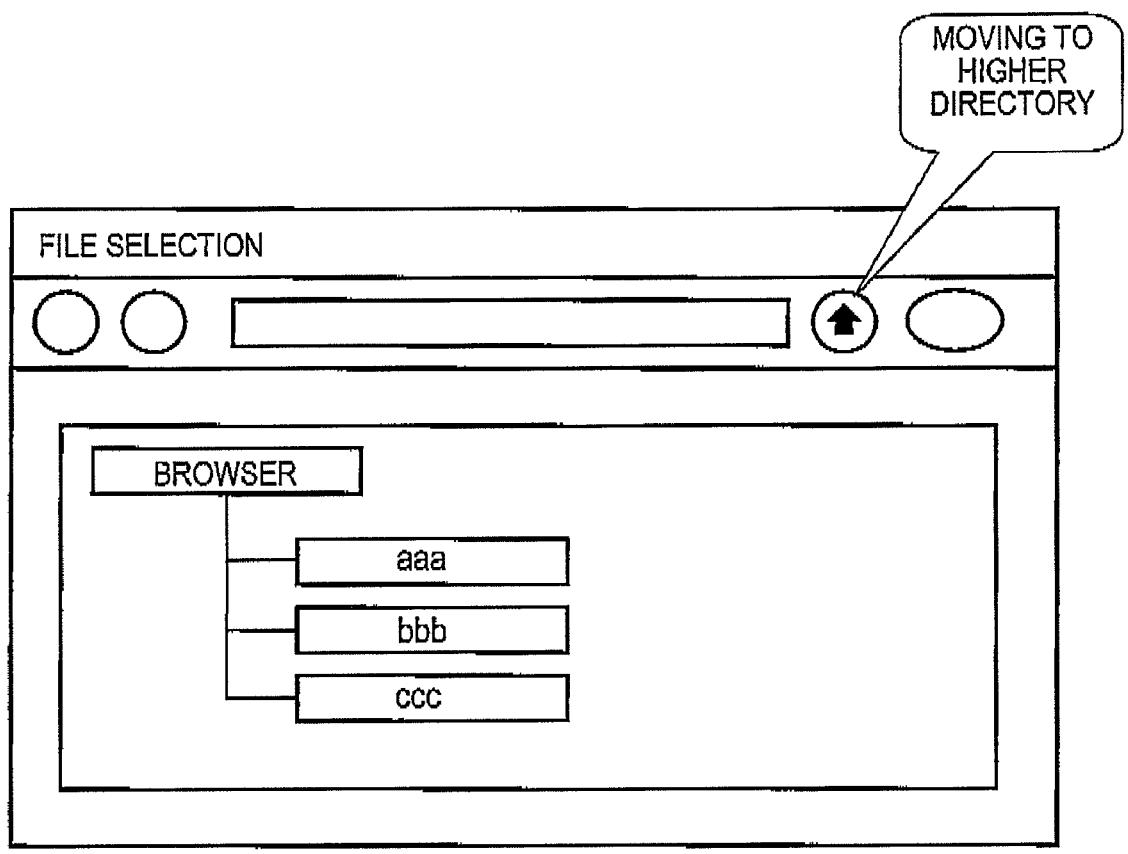
FIG. 10 is a view illustrating another display example of an external application.
Figure 11:
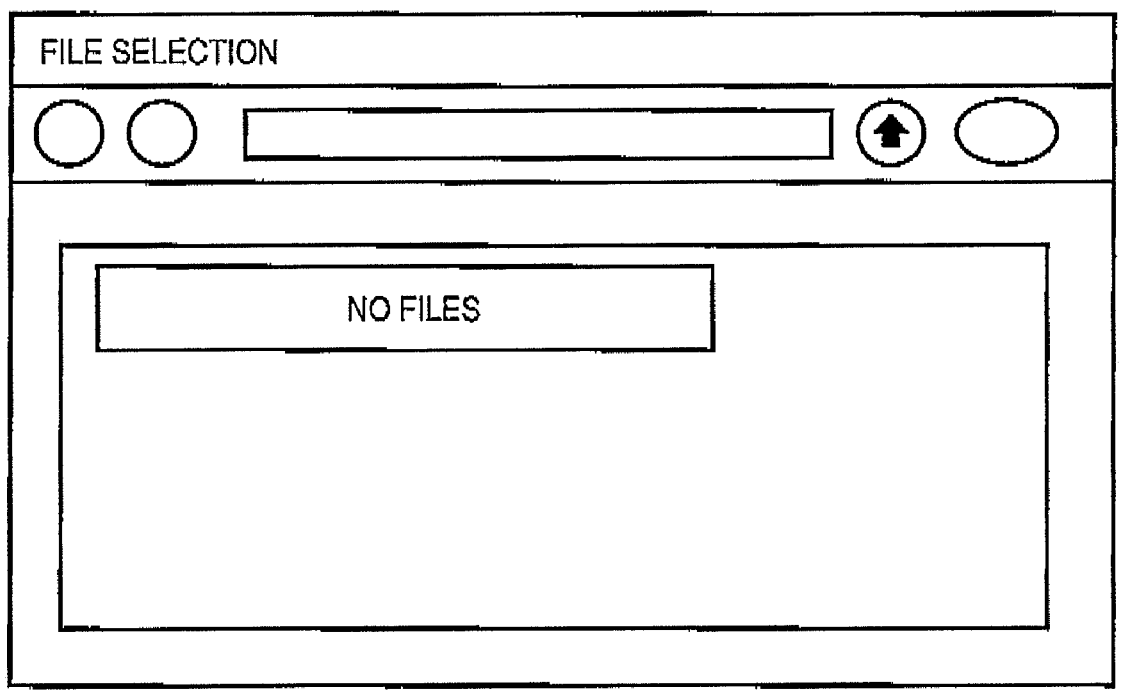
FIG. 11 is a view illustrating still another display example of an external application.

For example, in the case that "document management" is selected in FIG. 6, such a document management service display as shown in FIG. 9 is shown, and, for example, "retrieval" can be executed. Furthermore, as shown in FIG. 10, in the case that "file selection" is executed in this service, a file can be selected. FIG. 11 shows that no files exist. Other services provide functions corresponding to the purposes and usages thereof, and an appropriate display is shown on the liquid crystal display device 15*a* of the control panel device 15.

Figure 7:
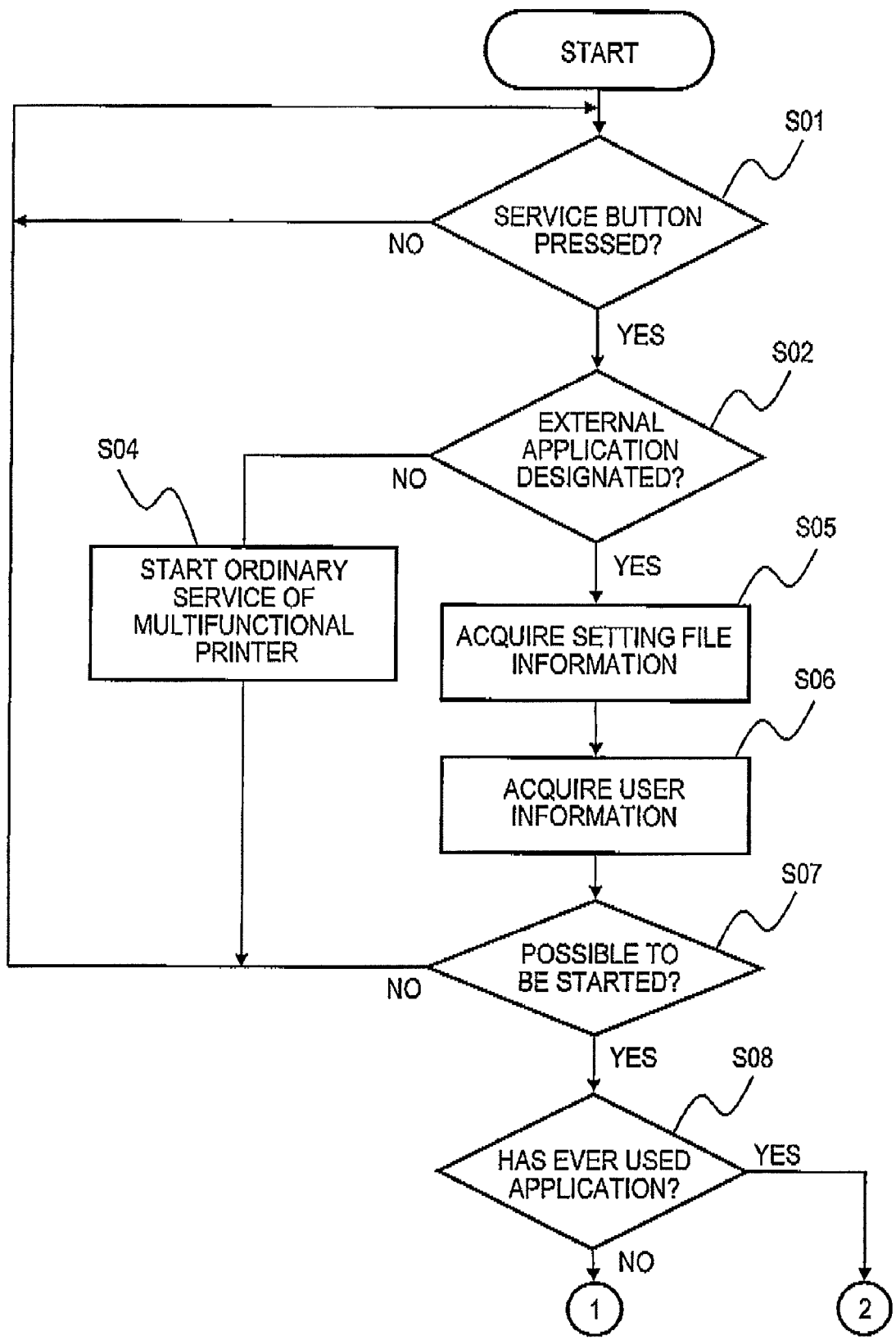
FIG. 7 is a view illustrating a detailed operation example of the above-mentioned exemplary embodiment
Figure 7:
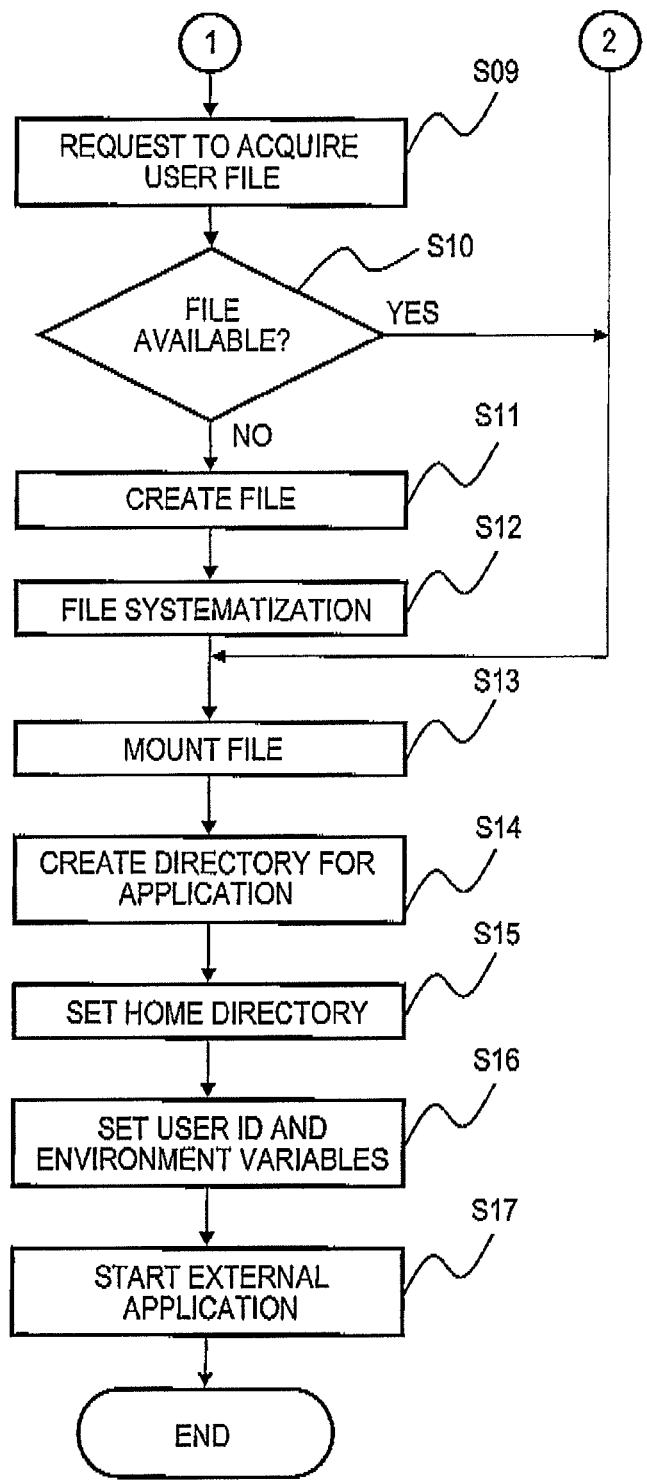

FIG. 7 shows an operation example of the exemplary embodiment, and the details thereof are described below.

[At step S01]: After the kernel and the daemon process are started, a service start state is obtained.

[At step S02]: The system monitors whether a service selection button has been pressed on the service selection display shown in FIG. 6. If a service selection button has been pressed, the processing advances to step S03.

[At step S03]: The system judges which service has been selected. If an external application has been selected, the processing advances to step S05. If the ordinary service of the multifunctional printer 10 has been selected, the processing advances to step S04.

[At step S04]: Since the ordinary service has been selected, the ordinary service of the multifunctional printer 10 is started, and the ordinary service is executed. After the ordinary service is completed, the processing returns to step S02.

[At step S05]: The system reads the setting file information of the selected external application from the isolated environment application setting file 34.

[At step S06]: The system acquires the information of a multifunctional printer user who is going to use the multifunctional printer. The information can be acquired from a card or the like when the multifunctional printer user logged in.

[At step S07]: The system judges whether the external application can be started. If the external application cannot be started, the processing returns to step S02, and the above-mentioned processing is repeated. If the external application can be started, the processing advances to step S08.

[At step S08]: The system judges whether the multifunctional printer user having logged in has ever used the external application. In the case that the user has ever used the external application, the processing advances to step S13. In the case that the user has never used the external application, the procedure advances to step S09.

[At step S09]: The system requests to acquire a multifunctional printer user file.

[At step S10]: The system judges whether the multifunctional printer user file is available. If the file is unavailable, the processing advances to step S11. If the file is available, the processing advances to step S13.

[At step S11]: In the case that the multifunctional printer user file is unavailable, a file is created, and the processing advances to step S12.

[At step S12]: The system performs file systematization for the created file. Hence, a file-based file system can be constructed. For example, the dmconfig utility can be used for the file systematization.

[At step S13]: The system mounts the file below the user's "home" directory below an isolated root.

[At step S14]: The system creates a directory for the application in the mounted file system.

[At step S15]: Setting is performed for the home directory. For example, the authority to perform retrieval is nullified.

[At step S16]: The user ID of the external application and environment variables are set. This setting is performed referring to, for example, the table information shown in FIG. 15. For example, the setuid command is used to set the user ID.

[At step S17]: The external application is started in an isolated environment.

After the external application was started and when the service is completed, the external application is completed. After this, the processing may return to step S02.

The setting information of the external applications 116 is described using XML, for example, as shown in FIGS. 13 and 14, but not limited to this.

Figure 12:
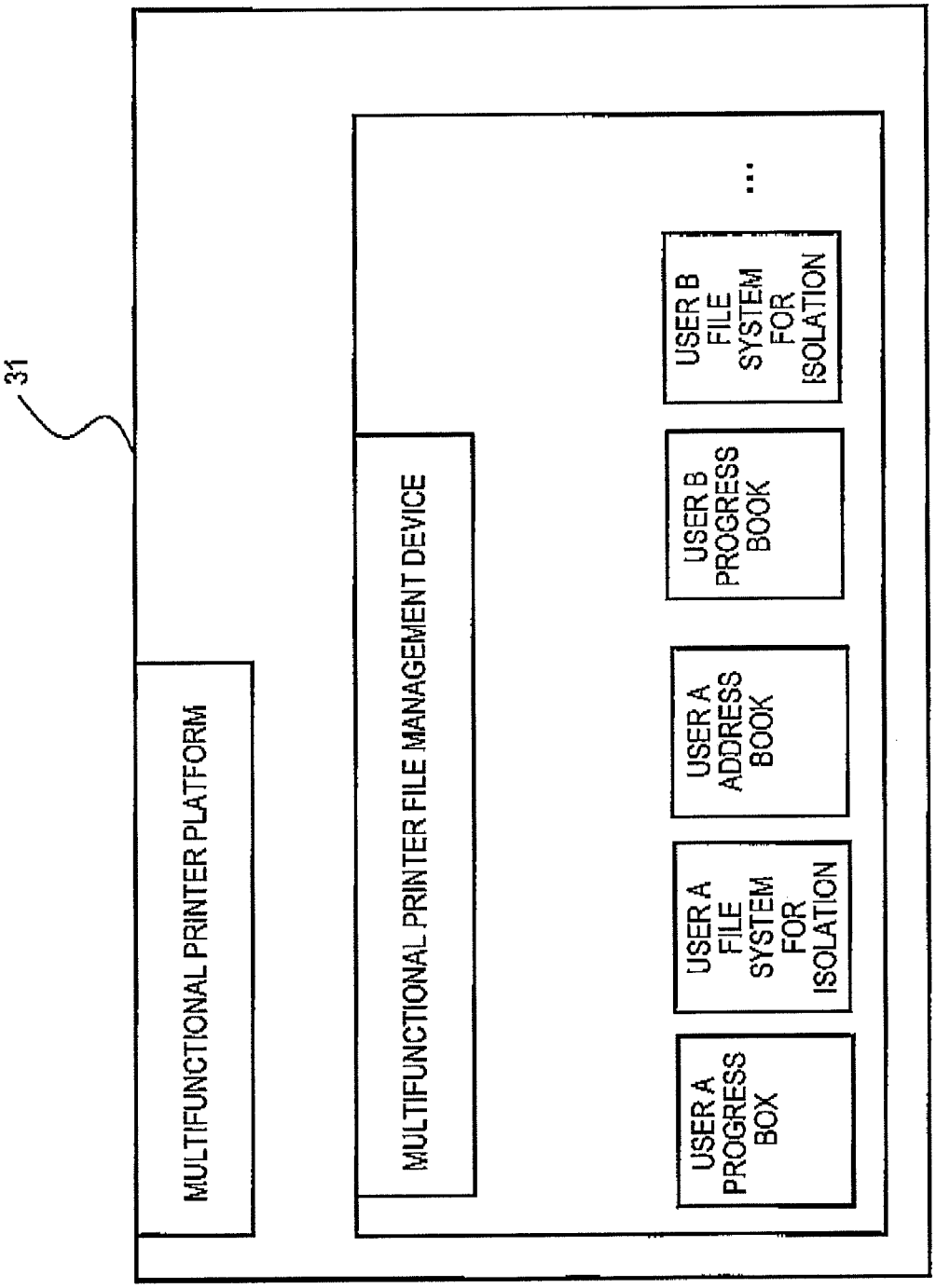
FIG. 12 is a view illustrating an example of a multifunctional printer file management device.

As shown in FIG. 12, the files for the external applications 116 of the multifunctional printer users are stored in and managed by the multifunctional printer file management device of the multifunctional printer platform 31 together with the progress box files for an ordinary multifunctional printer, address book files, etc.. And the file for the corresponding external application 116 of the multifunctional printer users is mounted in an isolated environment when the corresponding external application 116 is used.

Figure 8:
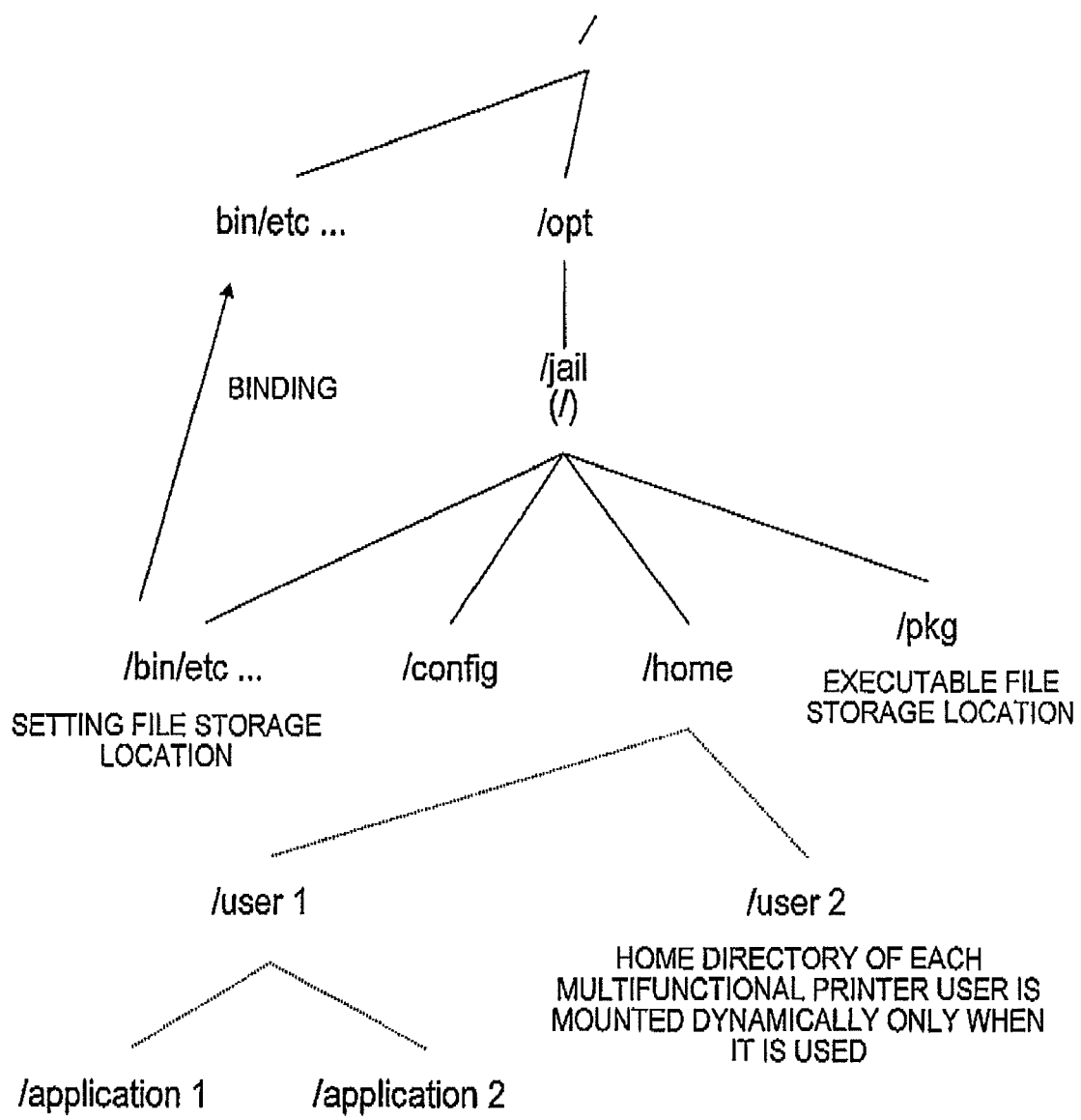
FIG. 8 is a view illustrating an example of the directory structure of the above-mentioned exemplary embodiment.

FIG. 8 is a snapshot showing the directory structure of the OS 30 when a multifunctional printer user (user1) has logged into the multifunctional printer 10 and has selected the service of the external application 116 ("application1" or "application2"). The multifunctional printer user is not a user who is managed by the OS 30. And the login and logout to/from the multifunctional printer 10 are different from the "login" and "logout" managed by the OS 30. For example, the process of starting to use the multifunctional printer 10 by the multifunctional printer user is herein referred to as "login" to the multifunctional printer 10, and the process of ceasing to use the multifunctional printer 10 is herein referred to as "logout" from the multifunctional printer 10. The login and logout of the multifunctional printer user can be detected using a detecting device, such as a card reader. In the case that the multifunctional printer 10 is used via a communication line, a password authentication section or the like can detect the login and logout of the multifunctional printer user.

Referring to FIG. 8, "/" represents the root directory, "/bin" contains basic commands, "/etc" contains setting files, and "/opt" contains additional application information. In this example, "/jail" is provided as a sub-directory of "/opt". Below this sub-directory, the root directories (for example, "/browser" and "/bunsho") of the respective isolated environments for the external applications 116 are placed. The root directories of the isolated environments, serving as the sub-directories of "/jail", are virtually changed to "/" using the chroot command. In addition, "/bin", "/etc", . . . , "/config", "/home", "/pkg", etc." are provided as the sub-directories of the root directories of the isolated environments below "/opt/jail". The sub-directories "/bin" and "/etc." of "/opt/jail" are obtained by binding the sub-directories "/bin" and "/etc" of the root directory "/". Furthermore, "/config" contains the setting files of the external applications 116. And "/home" contains sub-directories "/user1", "/user2", . . . for individually managing the data of the respective multifunctional printer users. Moreover, "home" serving as a sub-directory of the root directory of the isolated environment is different from the "home" directory (not shown in FIG. 8) serving as a sub-directory of the actual root directory ("/"). The former is used to store the usage data and the like of each multifunctional printer user in a sub-directory therebelow. On the other hand, the latter is used to store the usage data and the like of each system user (external application) managed by the OS. Still further, "/application1", "/application2", etc." are provided as the sub-directories of the directories "/user1", "/user2", . . . . These external applications, "/application1", "application2", etc., are placed as accessible resources.

In this example, "/user1", "/user2", . . . , in which a file system is obtained by file-systematizing files, is mounted is below "/home". When a multifunctional printer user has logged into the multifunctional printer 10, the file of the multifunctional printer user is mounted. When multiple multifunctional printer users use the multifunctional printer 10 simultaneously, the files of the multiple multifunctional printer users are mounted simultaneously. The capacity of the files is limited by "quota" information or the like at the time of file creation or the like.

Access to "/jail" and the higher directory structure by the external applications 116 serving as the users managed by the OS 30 is limited using the chroot command. A similar isolated environment may also be constructed using other sections, such as the "JAIL" utility provided by a virtual OS or FreeBSD (registered trade name) Since the file system of each multifunctional printer user is present in the directory structure only when it is used, the data of the multifunctional printer user is protected when only one multifunctional printer user uses an external application. Furthermore, even if multiple multifunctional printer users use one external application simultaneously and the file systems of the multifunctional printer users are mounted on the directory structure, the authority for the external applications 116 (the users of the OS 30) to retrieve the higher directory "/home" is nullified, whereby the directories for the other multifunctional printer users cannot be retrieved.

The above will herein be further described repeatedly. By mounting a file-type file system for each multifunctional printer user only when the file system is used, it is possible to protect the security of the user information of the multifunctional printer user (the other multifunctional printer users cannot access other user information). In addition, by treating the usage areas of the multifunctional printer users as files, the usage areas can be restricted, whereby it is possible to prevent one of the users from occupying the storage device. Hence, the reliability in information among the users is maintained, and the operation environment of each user is not damaged. For example, the cache information, the bookmark information, etc. of the browser can be managed for each user and can be used independently of those of the other multifunctional printer users. Furthermore, the external applications are automatically distinguished by the system without the need for being conscious of the multifunctional printer users and the like.

By executing the external applications in the isolated environments, the information on the side of the multifunctional printer 10 is made invisible to ensure security.

The user IDs managed by the OS 30 are set separately for the respective external applications, and the root directories (for example, "/browser" and "/bunsho") of the respective isolated environments, respectively serving as the sub-directories of "/opt/jail", are allocated to the respective external applications (the respective user IDs). Hence, the isolated environments being independent of the respective external applications (the respective user IDs) are constructed. As a result, one external application cannot access file (directory) information created by the other applications (the other external applications, the applications of the multifunctional printer platform 31, etc.). For this reason, even if a malicious application is operated, the application cannot access the other external application information, etc. As a result, the security, etc. among the external applications are ensured. Even in the case that multiple external applications are executed simultaneously by the same user, information exchange among the respective external applications is restricted, and security is ensured.

By restricting the access rights to the higher directories (home in the example), even if multiple multifunctional printer users use the multifunctional printer simultaneously, since they cannot acquire the directory information of the other multifunctional printer users, security is ensured.

The scope of the present invention is determined on the basis of the appended claims and is not limited to the specific configurations, purposes and effects of the exemplary embodiment thereof. The present invention is not limited to the above-mentioned exemplary embodiment, but may be modified variously without departing from the spirit and scope thereof. For example, in the above-mentioned example, independent isolated environments have been set for the respective external applications serving as the users managed by the OS. However, if the security of the main body system of the multifunctional printer is only required to be ensured, it may be possible that the external applications are put together into one user group, for example, and that one isolated environment is set for the one user group. In this case, for example, the user IDs of the external applications are set so as to be the same, or only one group ID is used for the user group, whereby an isolated environment is achieved on the basis of the user ID or the group ID.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processor for executing multiple applications including an external application under a control of an operating system, comprising:
    an executing section that executes the external application in an isolated environment based on user identification information that is under the control of the operating system and allocated to the external application; and
    a mounting section that mounts a file system of the information processor into a directory structure of the isolated environment when the external application is executed, the file system indicating a file for each application user who instructs to execute the external application,
    wherein the executing section executes the external application in only one isolated environment based on the user identification information.

2. The information processor according to claim 1, wherein the isolated environment is created using a command for changing a root of the directory structure.

3. The information processor according to claim 1,
    wherein the user identification information under the control of the operating system indicates a user identifier or a group identifier under the control of the operating system.

4. The information processor according to claim 1,
    wherein applications other than the external application include at least one of an image forming application, an image reading application and a facsimile communication application, each not placed in isolated environment.

5. The information processor according to claim 1, further comprising:
    a detecting section that detects the start and end of use by an application user; and
    a mounting section that,
        when the detecting section detects the start of use by the application user, mounts a file system for each application user into a directory structure and,
        when the detecting section detects the end of use by the application user, unmounts the file system from the directory structure.

6. The information processor according to claim 1, further comprising:
    a user interface section that includes applications other than the external application as selection elements;
    an adding section that adds the external application as a selection element to user interface section; and
    a controlling section that starts the external application when the selection element corresponding to the external application is selected by the application user.

7. A non-transitory computer readable medium storing a program causing a computer to execute a process for improving security, the process comprising:
    executing multiple applications including an external application under a control of an operating system,
    wherein the executing includes executing the external application in an isolated environment based on a user identifier that is under the control of the operating system and allocated to the external application,
    wherein the process further comprises mounting a file system of the computer into a directory structure of the isolated environment when the external application is executed, the file system indicating a file for each application user who instructs to execute the external application, and
    wherein the external application is executed in only one isolated environment based on the user identification information.

8. An information processor comprising:
    an image inputting section;
    an image outputting section;
    an first executing section that executes an application for achieving at least one of copying, manuscript reading and facsimile functions using at least one of said image inputting section and said image outputting section under the control of an operating system;
    an second executing section that executes another application in an isolated environment based on user identification information that is under the control of the operating system and allocated to the application; and
    a mounting section that mounts a file system of the information processor into a directory structure of the isolated environment when the another application is executed, the file system indicating a file for each application user who instructs to execute the another application,
    wherein the second executing section executes the another application in only one isolated environment based on the user identification information.

* * * * *